(12) United States Patent
Komulainen et al.

(10) Patent No.: US 6,658,047 B1
(45) Date of Patent: Dec. 2, 2003

(54) ADAPTIVE CHANNEL EQUALIZER

(75) Inventors: Petri Komulainen, Oulu (FI); Markku Heikkila, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/518,922

(22) Filed: Mar. 6, 2000

Related U.S. Application Data (63) Continuation-in-part of application No. 09/517,882, filed on Mar. 3, 2000.
(60) Provisional application No. 60/123,689, filed on Mar. 10, 1999.

(51) Int. Cl.$^7$ ............................................... H04B 1/707
(52) U.S. Cl. ...................................................... 375/150
(58) Field of Search ................................ 375/232, 148, 375/150, 343; 370/342, 441

(56) References Cited

U.S. PATENT DOCUMENTS

| | | | | |
|---|---|---|---|---|
| 5,519,727 A | * | 5/1996 | Okanoue et al. ............. | 375/232 |
| 5,548,616 A | | 8/1996 | Mucke et al. ................ | 375/295 |
| 5,566,201 A | | 10/1996 | Ostman ....................... | 375/200 |
| 5,596,571 A | | 1/1997 | Gould et al. ................. | 370/335 |
| 5,719,899 A | * | 2/1998 | Thielecke et al. ........... | 375/144 |
| 5,796,757 A | | 8/1998 | Czaja .......................... | 371/46 |
| 6,377,611 B1 | * | 4/2002 | Hwang ........................ | 375/140 |
| 6,496,543 B1 | * | 12/2002 | Zehavi ........................ | 375/295 |

OTHER PUBLICATIONS

S. Haykin, *Adaptive Filter Theory.* Upper Saddle River, NJ: Prentice Hall, third ed., 1996.

A. Duel–Hallen, J. Holtzman, and Z, Zvonar, *Multiuser Detection for CDMA Systems,* IEEE Personal Communications, pp. 46–58, Apr. 1995.

M.K. Varanasi and B. Aazhang, *Multistage Detection in–Asynchronous Code–Division Multiple Access Communications,* in IEEE Trans. on Communications, vol. 38, No. 4 Apr. 1990.

S.M. Kay, *Fundamentals of Statistical Signal Processing: Estimation Theory,* Prentice Hall, New Jersey, 1993.

H. Liu and M.D. Zoltowski, *Blind Equalization in Antenna Array CDMA Systems,* IEEE Transactions on Signal Processing, vol. 45, No. 1, pp. 161–172, Jan. 1997.

J.R. Treichler, C.R. Johnson Jr., M.G. Larimore, *Theory and Design of Adaptive Filters.* John Wiley & Sons, 1987.

S.L.Miller, *An Adaptive Direct–Sequence Code–Division Multiple Access Receiver for Multiuser Interference Rejection,* IEEE Transactions on Communications, Vol 43, pp. 1746–1755, Feb.–Apr., 1995.

(List continued on next page.)

*Primary Examiner*—Stephen Chin
*Assistant Examiner*—Kevin Kim
(74) *Attorney, Agent, or Firm*—Harrington & Smith, LLP (57) ABSTRACT

A receiver for use in a CDMA telecommunications system is disclosed. The receiver includes at least one antenna for receiving signals from a CDMA channel, an estimator for estimating an impulse response of the channel, and an adaptive equalizer. The estimator provides a reference for the adaptive equalizer, and the adaptive equalizer operates to estimate a transmitted chip sequence of the channel and to restore orthogonality among the received signals. The adaptive equalizer includes circuitry for utilizing a blind adaptive algorithm to estimate the transmitted chip sequence of the channel.

10 Claims, 5 Drawing Sheets

OTHER PUBLICATIONS

M. Latva–aho, *Advanced Receivers for Wideband CDMA Systems.* Doctoral thesis, Department of Electrical Engineering, University of Oulu, Finland, 1998.

M.L. Honig, U. Madhow and S. Verdu, *Blind Adaptive Multiuser Detection,* IEEE Transactions on Information Theory, vol. 41, pp. 944–960, Jul. 1995.

N. Zecevic and J.H.Reed, *Blind–Adaptation Algorithms for Direct–Sequence Spread–Spectrum CDMA Single–User Detection,* IEEE International Vehicular Technology Conference, VTC'97, pp. 2133–2137, May 1997.

Y. Bar–Ness and J.B. Punt, *Adaptive Bootstrap CDMA Multi–User Detector,* Wireless Personal Communications, Kluwer Academic Publisher, vol. 3, No. 1, pp. 55–71, 1996.

P.Komulainen, Y Bar–Ness and J. Lilleberg, *Simplified Bootstrap Adaptive Decorrelator for CDMA Downlink,* IEEE International Conference on Communications, ICC'98, Atlanta, USA, Jun. 1998, pp. 380–384.

D.P. Taylor, G.M. Vitetta, B.D. Hart and A. Mammela, *Wireless Channel Equalisation,* European Transactions on Telecommunications, vol. 9, No. 2, pp. 117–143, 1998.

S. Werner and J. Lilleberg, *Downlink Channel Decorrelation on CDMA Systems With Long Codes,* submitted to ICC'99, 1999.

I. Kaya, A.R. Nix and R. Benjamin, *Exploiting Multipath Activity Using Low Complexity Equalization Techniques for High Speed Wireless LAN's,* IEEE International Vehicular Technology Conference, VTC'98, Ottawa, Canada, May 1998, pp. 1593–1597.

Cacopardi et al., "Channel Estimation and Tracking of an Indoor Orthogonal Multicarrier DS–CDMA System Using Measured Channel Delay Profiles", May 1996, pp. 1559–1563, the 1996 IEEE Journal.

* cited by examiner

ADAPTIVE CHANNEL EQUALIZER

This is a continuation in part of U.S. patent application Ser. No. 09/517,882, entitled "Adaptive Channel Equalizer," by Petri Komulainen and Markku J. Heikkilä, filed Mar. 3, 2000, which claims priority under 35 U.S.C. §119(e) from Provisional Patent Application No. 60/123,689, filed Mar. 10, 1999, entitled "Adaptive Channel Equalizer," by Petri Komulainen and Markku J. Heikkilä. The disclosure of this Provisional Patent Application is incorporated by reference herein in its entirety.

FIELD OF THE INVENTION

This invention relates generally to communications systems, and, in particular to a receiver that performs adaptive channel equalization.

BACKGROUND OF THE INVENTION

CDMA systems are based on a digital, wideband, spread spectrum technology which transmits, multiple, independent user signals across an allocated segment of the radio spectrum. In CDMA, each user signal includes a different orthogonal code and a pseudo random binary sequence that modulates a carrier, spreading the spectrum of the waveform, and thus allowing a large number of user signals to share the same frequency spectrum. The user signals are separated in the receiver with a correlator which allows only the signal with the selected orthogonal code to be despread. The other user signals, whose codes do not match, are not despread, and as such, contribute to system noise. The signal to noise ratio of the system is determined by the ratio of the desired signal power to the sum of all interfering signals, enhanced by the system processing gain and the ratio of the spread bandwidth to the baseband data rate.

This also applies to the 3rd generation wideband CDMA (WCDMA) standards currently proposed, where different spreading factors and variable user data rates can be supported simultaneously, that is, various users are multiplexed to the channel typically by orthogonal spreading codes. In CDMA systems in general, however, due to multipath propagation and frequency-selective fading, the orthogonality between the various users' waveforms is degraded, and multiple access interference impairs the performance of the receiver.

The interference generated by the other user signals is called multiple access interference, and is essentially caused by the amount of user traffic in the channel, which corrupts the code orthogonality at the receiver.

Several multiuser detection schemes have been proposed to alleviate multiple access interference in the uplink of direct-sequence code division multiple access (DS-CDMA) systems. These methods, however, are too complex and burdensome to be incorporated into a conventional user terminal because they would negatively impact its power consumption and size.

Reference in this regard may be had to: A. Duel-Hallen, J. Holtzman, and Z. Zvonar, "Multiuser detection for CDMA systems," *IEEE Personal Communications*, pp. 46–58, April 1995.

As an alternative, several adaptive algorithms with low computational complexity have been proposed to alleviate multiple access interference in CDMA systems. For example, in the presence of a known training sequence a least mean square (LMS) algorithm can be applied. However, when no training sequence is available, or training is impractical, blind adaptation schemes are better suited for CDMA interference reduction.

Reference in this regard may be had to: M. L. Honig, U. Madhow, and S. Verdú, "Blind adaptive multiuser detection," *IEEE Transactions on Information Theory*, vol. 41, pp. 944–960, July 1995. Reference may also be had to: N. Zecevic and J. H. Reed, "Blind adaptation algorithms for direct-sequence spread-spectrum CDMA single-user detection," *IEEE International Vehicular Technology Conference*, VTC'97, May 1997, pp. 2133–2137.

However, most of the proposed adaptive interference suppression methods rely on the symbol level cyclostationarity of the signal. Unfortunately, this excludes their application to systems employing long scrambling codes, such as systems employing wideband CDMA (WCDMA), wherein the pseudorandom scrambling changes the correlation properties of the signal from symbol to symbol.

OBJECTS AND ADVANTAGES OF THE INVENTION

It is an object and advantage of this invention to provide a receiver which utilizes an adaptive channel equalization function to restore the orthogonality between synchronous users' waveforms and to suppress other multiple access signals.

It is a further object and advantage of this invention to apply adaptive channel equalization to a CDMA system by first estimating a transmitted chip sequence, and which then utilizing an algorithm to converge to a linear minimum mean-square error (LMMSE) solution.

It is a further object and advantage of this invention to provide a CDMA receiver with improved performance which is suited for systems using long scrambling codes, such as third generation WCDMA systems.

It is a further object and advantage of this invention to provide a CDMA receiver with improved performance which does not require training sequences or training information, with the exception of ordinary channel estimation, which may be based on either dedicated pilot symbols, or a pilot channel.

SUMMARY OF THE INVENTION

The foregoing and other problems are overcome and the objects of the invention are realized by methods and apparatus in accordance with embodiments of this invention.

A receiver for use in a CDMA telecommunications system is disclosed. The receiver includes at least one antenna for receiving signals from a CDMA channel, an estimator for estimating an impulse response of the channel, and an adaptive equalizer. The estimator provides a reference for the adaptive equalizer, and the adaptive equalizer operates to estimate a transmitted chip sequence of the channel, to restore the orthogonality between synchronous users' waveforms, and to suppress other multiple access signals. The adaptive equalizer includes circuitry for implementing a blind adaptive algorithm to estimate the transmitted chip sequence of the channel.

A receiver for use in a CDMA telecommunications system is disclosed. The receiver includes a least one antenna, an estimator for estimating an impulse response of a channel, and an adaptive equalizer. The estimator provides a reference for the adaptive equalizer, and the adaptive equalizer operates to equalize a signal in the channel by estimating the transmitted chip sequence. The effect of the adaptive linear receiver algorithm is to restore the orthogonality of the signal's waveform.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

As stated above, in a synchronous CDMA downlink using orthogonal spreading codes, multiple access interference is essentially caused by the multipath channel. The multiple access interference then, can be suppressed by channel equalization because the users' orthogonal signals propagate through the same channel to the receiver of interest.

Reference in regard to channel equalization may be had to: D. P. Taylor, G. M. Vivetta, B. D. Hart, and A. Mammela, "Wireless channel equalization," *European Transactions on Telecommunications*, vol. 9, no. 2, pp. 117–143, 1998.

Further reference may be had to S. Werner and J. Lilleberg, "Downlink channel decorrelation in CDMA systems with long codes," *IEEE Vehicular Technology Conference*, VTC'99, May 1999. Reference may also be had to: P. Komulainen and M. J. Heikkilä, "Adaptive channel equalization based on chip separation for CDMA downlink," *IEEE International Symposium on Personal, Indoor and Mobile Radio Communications*, PIMRC'99, September 1999.

A nonzero delay spread of the frequency-selective channel causes signal leakage between the users according to the cross-correlation properties of the spreading waveforms. The interpath interference of a single user may be significant, especially when processing gains are low, and this interference may be reduced by channel equalization.

In an aspect of the invention, a receiver 10 is disclosed having an adaptive linear interference suppression algorithm. The algorithm is based on linear channel equalization and is suitable for synchronous CDMA systems using orthogonal spreading codes with long code scrambling. The algorithm is adaptive in that it converges to the linear minimum mean-square error solution by applying Griffiths' algorithm. The receiver does not require any training sequence or training information, with the exception of ordinary channel estimation, which can be based on either dedicated pilot symbols or a pilot channel.

Figure 1:
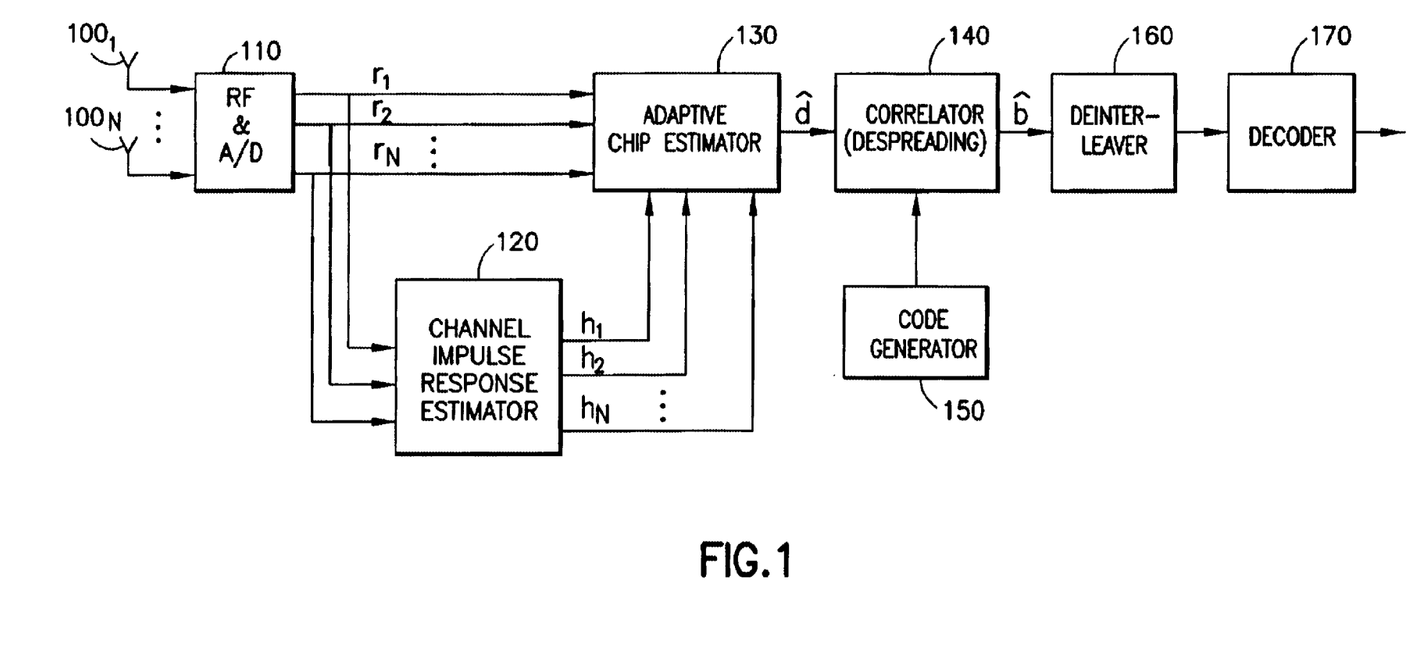
FIG. 1 shows a block diagram of a receiver in accordance with an aspect of this invention.

FIG. 1 shows a block diagram of the receiver 10 in accordance with an aspect of this invention. At least one antenna $100_1, \ldots, 100_N$ receives signals from a CDMA telecommunications channel. The signals are coupled to a conventional RF transceiver and A/D converter 110. The conventional RF transceiver and A/D converter 110 may optionally perform chip waveform filtering. The converted signals $r_1, \ldots, r_N$ are coupled to a channel impulse response estimator 120 and to an adaptive chip estimator 130. The channel impulse response estimator 120 operates to estimate the impulse response of the CDMA channel and provide reference input vectors $\bar{h}_1, \ldots, \bar{h}_N$ to the adaptive chip estimator 130. The adaptive chip estimator 130 may be a linear filter, which is described in detail below. The output of the adaptive chip estimator 130 is coupled to a symbol-synchronized code correlator 140. The correlator 140 despreads the output d of the adaptive chip estimator 130 by multiplying it with the output of a code generator 150, and then integrating over the symbol period. The code generator 150 is capable of generating long and short codes. The output of the correlator 140 is coupled to a conventional deinterleaver 160 which in turn is coupled to a conventional decoder 170 which outputs data decisions.

SIGNAL MODEL

In a CDMA downlink with K symbol-synchronous users, the base station generates the sum of the users' signals and scrambles it by using a long pseudonoise (PN) code, c(i). The period of the complex scrambling code can extend over an entire frame of symbols. A so-called multiuser chip sequence may be defined as:

$$d(i) = c(i) \sum_m \sum_{k=1}^K a_k(m) b_k(m) s_k(i - mG) \quad (1)$$

where i, m, and k are the chip, symbol, and user index, respectively. The real and positive amplitude $a_k(m)$ is due to power control, and $b_k(m)$ is a quadrature phase shift keying (QPSK) data symbol of user k. Spreading code $s_k$ is assumed to be a Walsh code and, thus, the spreading codes of the users are (ideally) orthogonal. The spreading factor (processing gain) can be denoted by G, $s_k(i)=\pm 1$ for i=0, 1, ..., G−1, and zero otherwise. Clearly, the multiuser chip sequence is formed as the sum of all users' chips. Due to the long PN code scrambling, $\{d(i)\}_i$ is a sequence of uncorrelated complex signal elements, and due to the user-dependent power control, its amplitude distribution is unknown to the receiver.

To limit the required bandwidth, sequence $\{d(i)\}_i$ is transmitted after filtering by a pulse shaping filter with impulse response p(τ). Assuming that the channel impulse response during chip interval i is g(τ, i), the overall impulse response experienced by the chip sequence is h(τ,i)=g(τ,i)*p(τ−iT_C), where $T_C$ is the chip interval and * denotes convolution. For a vector presentation, the response is time-discretized by taking $N_S$ samples per chip interval to obtain impulse response vector h(i). Now, the received signal vector can be written as.

$$r = Hd + n, \quad (2)$$

where $$H = (\ldots h(-1) h(0) h(1) \ldots) \quad (3)$$

and $$d = \begin{pmatrix} \vdots \\ d(-1) \\ d(0) \\ d(1) \\ \vdots \end{pmatrix}. \quad (4)$$

Matrix H includes both the effect of the pulse shaping filter and the channel. It can also be considered to represent the effect of a receiver front-end filter (not shown in FIG. 1). Vector n is an arbitrary noise or interference vector assumed to be uncorrelated with d. A truncated form of equation (2) may be defined as:

$$r(i) = \begin{pmatrix} r(iN_s - M_1) \\ \vdots \\ r(iN_s) \\ \vdots \\ r(iN_s + M_2) \end{pmatrix} = H(i)d + n(i). \quad (5)$$

Figure 2:
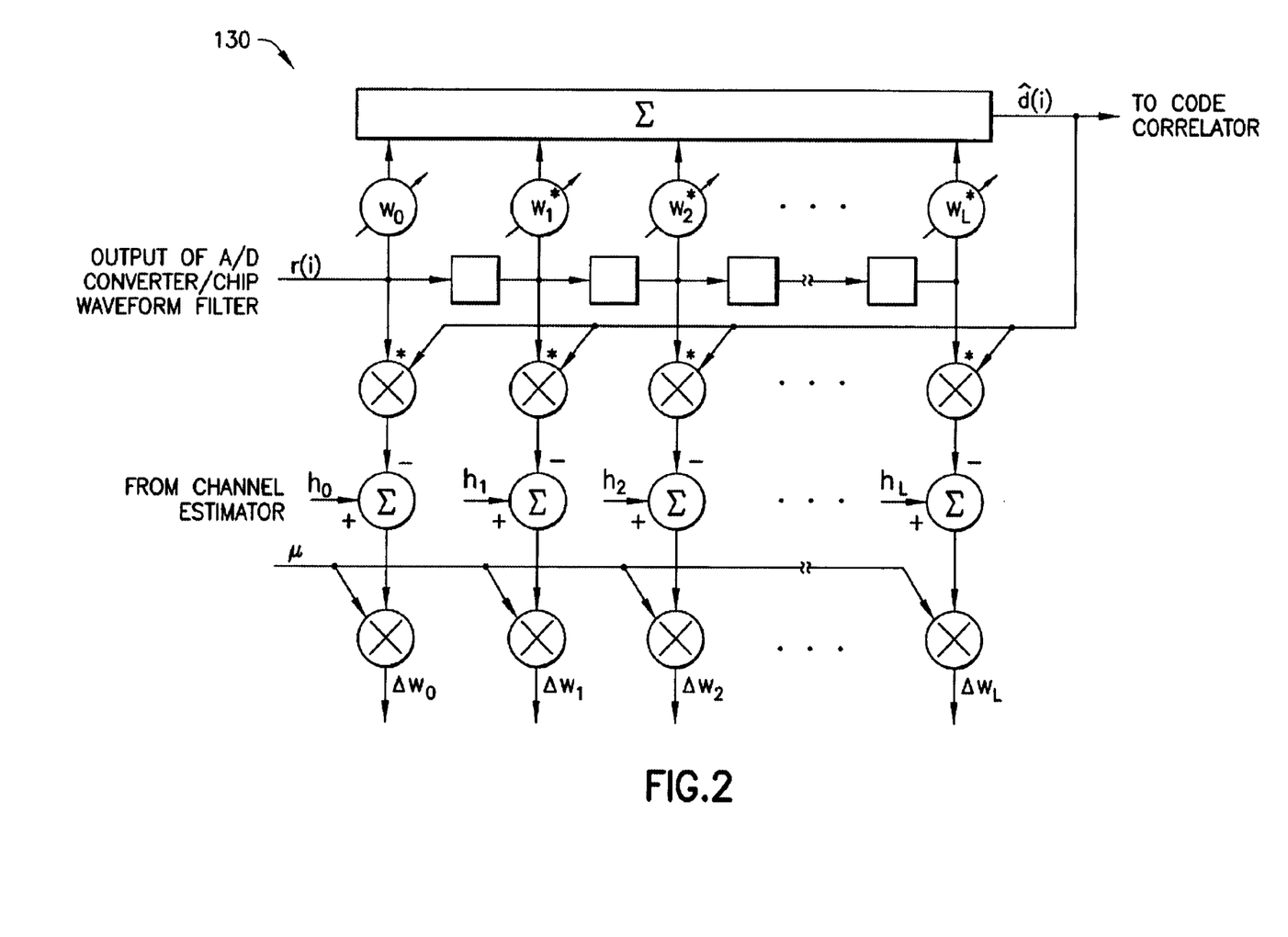
FIG. 2 shows a block diagram of an adaptive estimation filter in accordance with an aspect of this invention, where N=1 (single antenna) and $N_S$=1 (no oversampling).

Sample index $iN_S$ is defined as the index of the sample with which the pulse conveying d(i) begins. Clearly, H(i) and n(i) simply hold the required rows of H and n, respectively. Constants $M_1$ and $M_2$ are real and positive and define the length of the linear channel equalizer defined in the sequel. This is illustrated in FIG. 2 for the case where $M_1+M_2=L$

LMMSE CHIP ESTIMATION

In this section, the linear fractionally spaced channel equalizer, which is optimal in the minimum mean-square sense, is defined. The approach is to suppress the multiple access interference by striving to restore the orthogonality of the users' waveforms at the receiver by estimating the transmitted multiuser chips d(i), and thus by equalizing the channel. With a perfectly estimated chip sequence, the desired user's signal can be restored without any residual interference from the other users by correlating the multiuser chip sequence with the long scrambling code and the short code of the user.

It is possible to describe the linear minimum mean-square error (LMMSE) channel equalizer using the signal model of equation (5).

Reference in this regard may be had to: S. M. Kay, *Fundamentals of Statistical Signal Processing: Estimation Theory*, Prentice Hall, N.J., 1993.

By using the presented signal model in equation (5), the linear minimum mean-square error (LMMSE) channel equalizer can be written as $$\hat{d}(i) = \bar{h}^H(i)\left(H(i)H^H(i) + \frac{1}{\sigma_d^2}C_{nn}\right)^{-1} r(i) \quad (6)$$

where $(\cdot)^H$ denotes Hermitian transpose, $\bar{h}(i)$ is the column of H(i) that corresponds to d(i), $\sigma_d^2$ is the average power of the uncorrelated multiuser chips, and $C_{nn}$ is the noise covariance matrix. Clearly, the LMMSE solution in equation (6) requires estimation of the channel impulse response and the covariance matrix. In addition, the required matrix inversion may result in unacceptable computational complexity in a fast changing environment.

ADAPTIVE ALGORITHM

Because the direct solution for the equalizer suffers from high computational complexity an adaptive method is next considered to adjust the coefficients of the transversal filter. The problem of the adaptive approach is that no training multiuser chip sequence is available.

In the following, a blind adaptive algorithm is defined, which does not require any training sequence but only ordinary channel estimation. An implementation of the blind adaptive algorithm as included in the adaptive chip estimator 130 is shown in FIG. 2 for the case of a single antenna (N=1) without oversampling ($N_S$=1). The output $r_1$ of the RF transceiver and A/D converter 110 (FIG. 1) is shown here in FIG. 2 as input r(i). The output $\bar{h}_1=(h_0, \ldots, h_L)^T$ of the channel impulse response estimator 120 (FIG. 1) is also an input to the adaptive chip estimator 130. The operation of the adaptive chip estimator 130 will now be described in detail.

Let the estimate of d(i) in the case of a single receiving antenna (omitting the antenna index) be:

$$\hat{d}(i)=W^H(i)r(i). \quad (7)$$

The algorithm to update the complex coefficients of the fractionally spaced multiuser chip estimator, also referred to as the adaptive chip estimator 130, is $$w(i+1)=w(i)+\mu(i)(E\{r(i)\; d\cdot(i)\}-r(i)\hat{d}\cdot(i))=w(i)+\mu(i)(\sigma_d^2\bar{h}(i)-r(i)\hat{d}\cdot(i)) \quad (8)$$

where $E(\cdot)$ denotes expectation and $(\cdot)^*$ complex conjugate, $\mu(i)$ is a possibly time varying step size parameter, and $\bar{h}(i)$ is the column of H(i) which corresponds to d(i) in equation (5). The need for training sequence is avoided by using the knowledge of the correlation between the desired signal (multiuser chip) and the received signal. For this, the receiver 10 employs a channel estimator to estimate the channel impulse response h(i). Note that the knowledge of chip power $\sigma_d^2$ is not required in practice, as this factor affects only the scaling of the filter output. A presently preferred algorithm, given in equations (7) and (8), is referred to as Griffiths' algorithm.

Reference in this regard may be had to J. R. Treichler, C. R. Johnson, Jr., and M. G. Larimore, *Theory and Design of Adaptive Filters*, John Wiley & Sons, 1987.

The implementation of Griffiths' algorithm is a modification of an LMS algorithm. By examining the steady-state of equation (8) it can be seen that the adaptation converges to the Wiener solution.

Returning to FIG. 1, as stated above, the output of the adaptive chip estimator 130 is fed to the symbol-synchronized code correlator 140 which despreads and descrambles the signal and outputs symbol decisions. In the beginning of operation, for example, upon initialization, the filter coefficients can be initialized by the channel impulse response, and thus the receiver resembles an ordinary RAKE receiver.

In a general case the receiver may have several antennas. Generalization of equation (7) and equation (8) to an N-antenna system yields $$\hat{d}(i) = (w_1^H(i) \; \ldots \; w_N^H(i)) \begin{pmatrix} r_1(i) \\ \vdots \\ r_N(i) \end{pmatrix} \quad (9)$$

$$\begin{pmatrix} w_1(i+1) \\ \vdots \\ w_N(i+1) \end{pmatrix} = \begin{pmatrix} w_1(i) \\ \vdots \\ w_N(i) \end{pmatrix} + \mu(i) \begin{pmatrix} \sigma_d^2 \bar{h}_1(i) - r_1(i)\hat{d}^*(i) \\ \vdots \\ \sigma_d^2 \bar{h}_N(i) - r_N(i)\hat{d}^*(i) \end{pmatrix} \quad (10)$$

where the vectors are defined as earlier and the additional subscripts refer to the antenna index. The structure of the adaptive receiver 10 with multiple antennas can be seen in FIG. 1.

PERFORMANCE EVALUATION

In this section, the performance of the disclosed receiver using adaptive channel equalization is examined and compared to an ordinary RAKE receiver. Consider a WCDMA downlink using QPSK modulation with K active, equal power users each assigned a Walsh code of length G=4 or G=32. A complex Gold sequence is used as a scrambling code. No error correction coding is used in the performance simulations.

The receivers are tested in a time-varying Rayleigh channel with delay spread of 1 µs and with three resolvable paths of equal average power. A chip rate of 4 MHz, root raised cosine pulse shape filtering, a carrier frequency of 2 GHz, and a vehicle speed of 5 km/h are used in the simulations. Both single-antenna and two-antenna receivers are simulated. In the two-antenna case, the antennas are assumed to be uncorrelated. Perfect estimates of the channel impulse response are given to the receivers.

Figure 3:
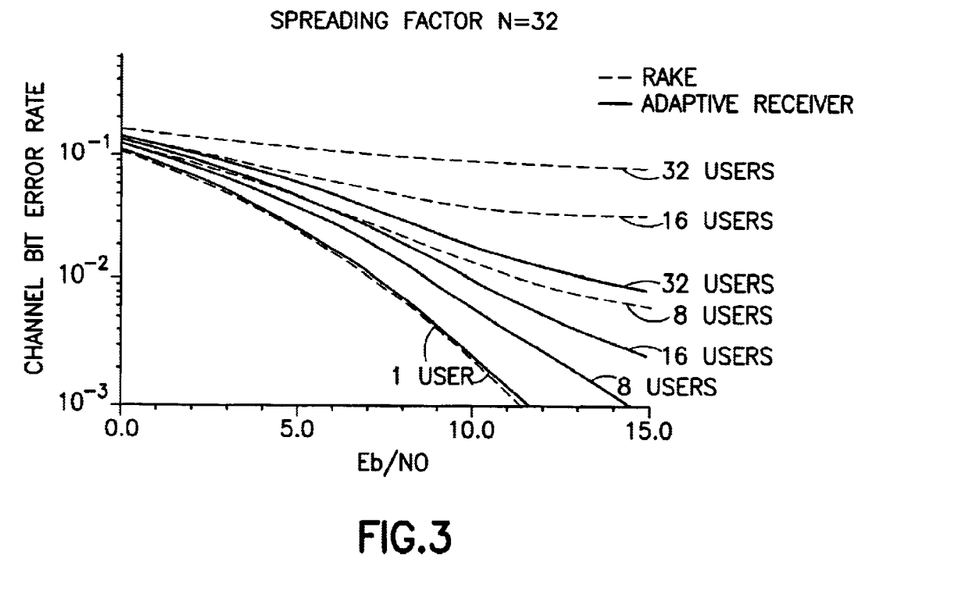
FIG. 3 shows the BER performance curves of the receiver using a spreading factor G=32 and a single receiver antenna.
Figure 4:
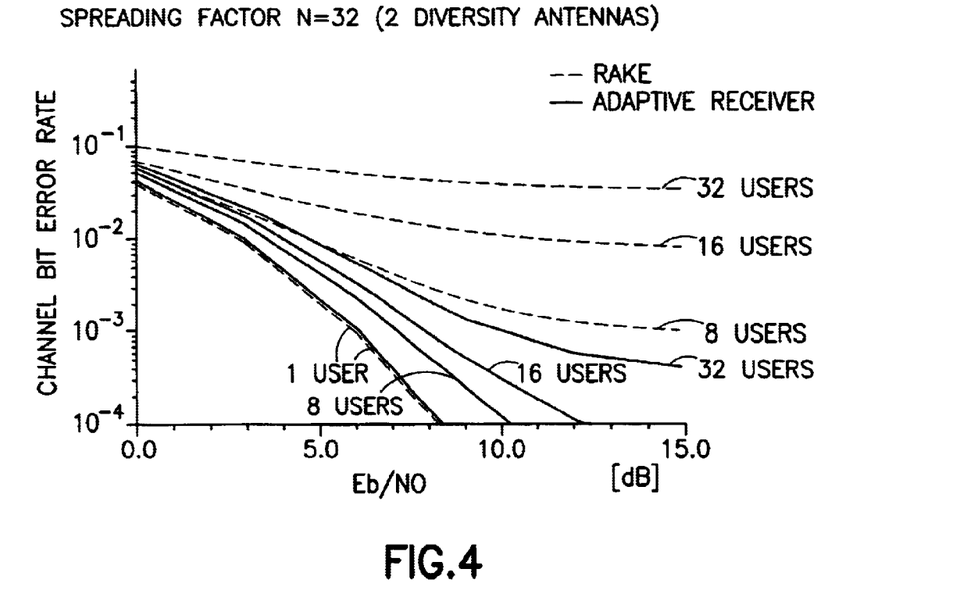
FIG. 4 shows the BER performance curves using a spreading factor G=32 and two receiver antennas.
Figure 5:
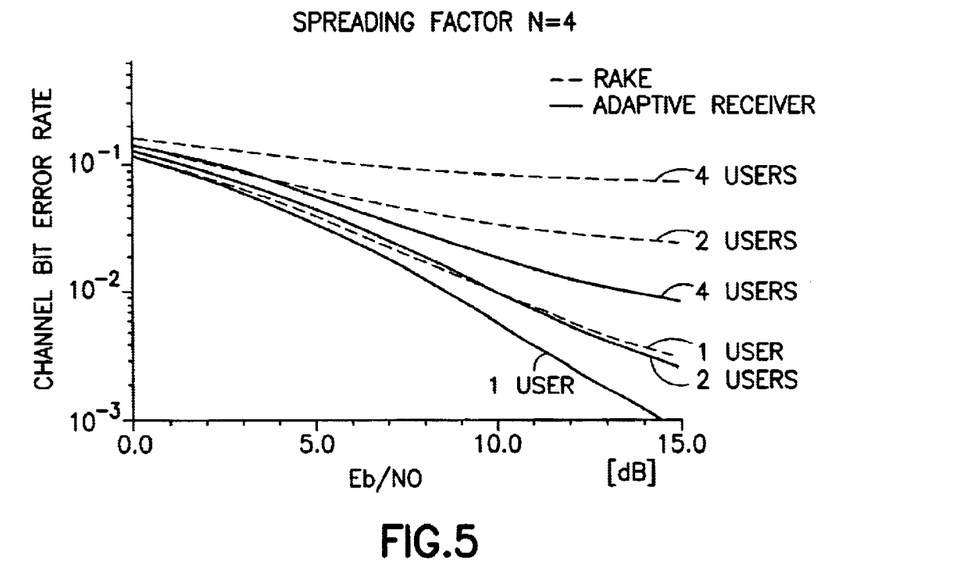
FIG. 5 shows the BER performance curves when using a spreading factor G=4 and a single receiver antenna.
Figure 6:
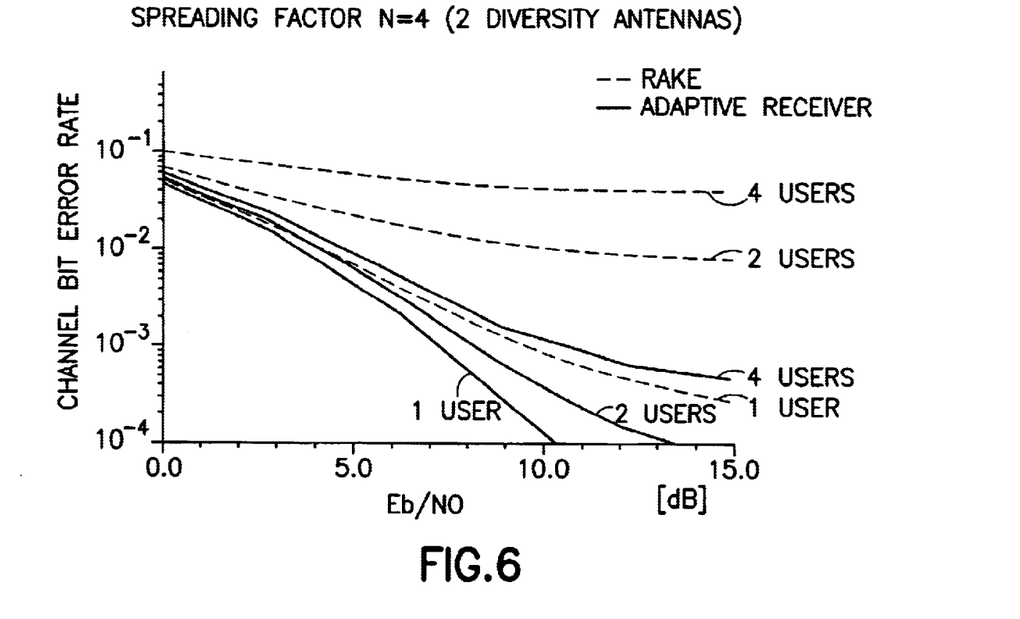
FIG. 6 shows the BER performance curves when a spreading factor G=4 has been used with two receiver antennas.

FIGS. 3 and 4 show the BER performance curves with a spreading factor G=32 and with one and two receiver antennas, respectively. Note that $E_b/N_0$ is measured per antenna element. Similarly, FIGS. 5 and 6 show the corresponding curves when spreading factor G=4 has been used. In all the figures, several values of the number of users are tested.

Figure 7:
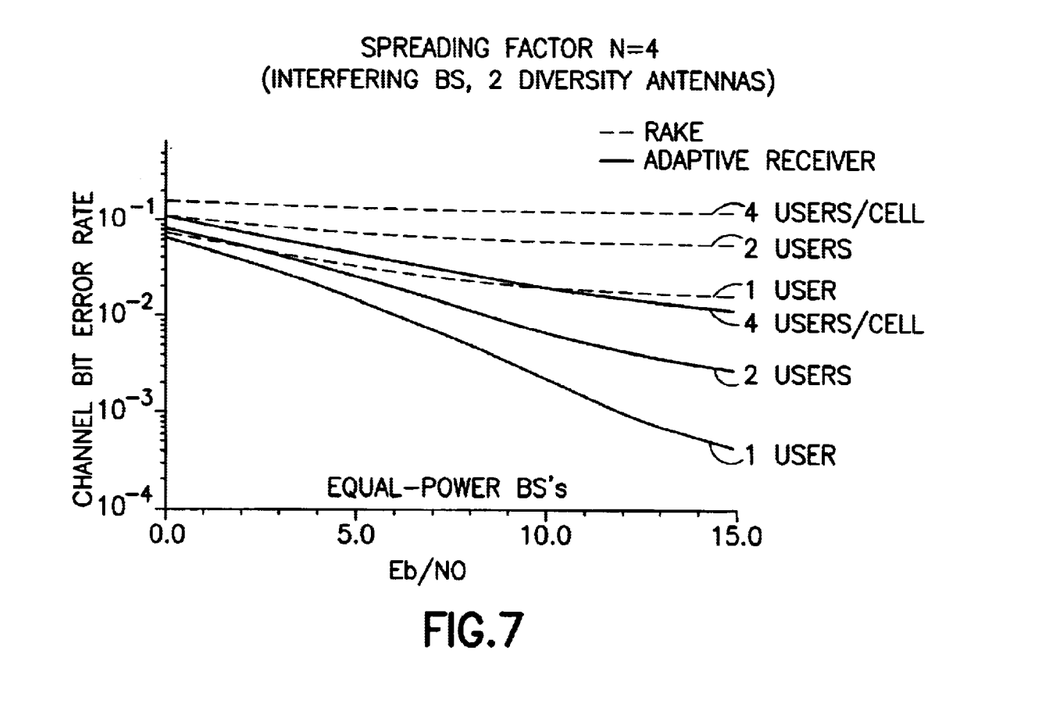
FIG. 7 shows the effects on the BER of an interfering base station when a spreading factor G=4 has been used with two receiver antennas.

In FIG. 7, the effect of an interfering base station on both the receivers is presented. The interference power is assumed to be equal to the received power of the desired base station, and a three-path fading channel (with a different delay profile) is used as the interference generator.

The results show that the disclosed adaptive receiver can suppress multiple access interference efficiently. With a spreading factor of G=4, the channel equalization approach gives a performance gain in the case of a single-user because the interpath interference is significant. As the number of users increases, the channel equalization works more and more efficiently as the signal-to-noise ratio of the multiuser chips gets higher. Clearly, the adaptive equalizer can utilize the whole transmission power of the base station. With diversity antennas the performance difference between RAKE and the adaptive receiver is even larger. Furthermore, the LMMSE solution exploits the knowledge of the covariance of the interference, and thus the disclosed adaptive receiver tolerates structured intercell interference considerably better than conventional RAKE receivers.

It should be understood that that the functions described herein may be implemented with discrete circuit elements, or as software routines that are executed by a suitable data processor. A combination of circuit elements and software routines may also be employed. Also, while the use of Griffiths' algorithm is disclosed as a presently preferred embodiment, other algorithms that provide an adaptive complex chip estimation filter may be used.

Thus, while the invention has been particularly shown and described with respect to preferred embodiments thereof, it will be understood by those skilled in the art that changes in form and details may be made therein without departing from the scope and spirit of the invention.

What is claimed is:

1. A receiver for use in a synchronous CDMA telecommunications system that uses orthogonal spreading codes, comprising:
   at least one antenna for receiving users' signals from a CDMA channel;
   a channel estimator, coupled to said antenna, for estimating an impulse response of said channel;
   an adaptive chip estimator coupled to said antenna and further coupled to said channel estimator, wherein said channel estimator provides a reference for said adaptive chip estimator, and said adaptive chip estimator operates to estimate a transmitted chip sequence received from said channel for restoring an orthogonality among said received users' signals; and
   a correlator, coupled to said adaptive chip estimator, for despreading an output of said adaptive chip estimator to obtain an estimate for data symbols of said received users' signals.

2. The receiver of claim 1, wherein said adaptive chip estimator further comprises circuitry for utilizing a blind adaptive algorithm to estimate said transmitted chip sequence received from said channel.

3. The receiver of claim 1, wherein said adaptive chip estimator further comprises circuitry for utilizing Griffiths' algorithm to converge to a linear minimum mean-square error solution.

4. A method for receiving signals in a synchronous CDMA telecommunications system that uses orthogonal spreading codes, said method comprising:
   receiving signals from a CDMA channel;
   estimating an impulse response of said channel; and
   adaptively estimating a transmitted chip sequence in a signal received from said channel by using said estimated impulse response of said channel as a reference to restore orthogonality among said received signals; and
   despreading said estimated transmitted chip sequence to obtain an estimate for data symbols.

5. The method of claim 4, wherein adaptively estimating the transmitted chip sequence further comprises utilizing a blind adaptive algorithm to estimate said transmitted chip sequence received from said channel.

6. The method of claim 4, wherein adaptively estimating the transmitted chip sequence further comprises employing Griffiths' algorithm to converge to a linear minimum mean-square error solution.

7. A method for use with a synchronous CDMA downlink having K symbol-synchronous users, said method to receive a downlink signal with a mobile station and comprising:
   at a base station, generating a sum of users' signals and scrambling the sum using a long pseudonoise (PN) code, c(i), where a multi-user chip sequence is defined as:

$$d(i) = c(i) \sum_m \sum_{k=1}^{K} a_k(m) b_k(m) s_k(i - mG)$$

where i, m, and k are a chip, symbol, and user index, respectively, where the real and positive amplitude $a_k(m)$ is due to power control, where $b_k(M)$ is a complex data symbol of user k, where a spreading code $s_k$ of multiple users are ideally orthogonal, and where a spreading factor is denoted by G, $s_k(i)=\pm 1$ for i=0, 1, . . . , G−1, and zero otherwise, where the multi-user chip sequence is formed as the sum of all users' chips and where $\{d(i)\}_i$ is a sequence of uncorrelated complex signal elements;
   limiting the required bandwidth by transmitting sequence $\{d(i)\}_i$ after filtering with a pulse shaping filter with impulse response p(τ), where the channel impulse response during a chip interval i is g(τ, i), and where the overall impulse response experienced by the chip sequence is $h(\tau,i)=g(\tau,i)*p(\tau-iT_C)$, where $T_C$ is the chip interval and * denotes convolution;

receiving the transmitted signal;

estimating the channel impulse response from the received signal using a channel impulse response estimator that comprises sampling the received signal and, in a vector representation, the response is time-discretized by taking $N_S$ samples per chip interval to obtain impulse response vector h(i) such that a received signal vector is represented by:

$$r = Hd + n,$$

where $$H = (\ldots h(-1)h(0)h(1)\ldots)$$

and $$d = \begin{pmatrix} \vdots \\ d(-1) \\ d(0) \\ d(1) \\ \vdots \end{pmatrix},$$

where matrix H includes at least the effect of the pulse shaping filter and the channel, where vector n is an arbitrary noise or interference vector assumed to be uncorrelated with d, where a truncated form of the equation for r is expressed as:

$$r(i) = \begin{pmatrix} r(iN_s - M_1) \\ \vdots \\ r(iN_s) \\ \vdots \\ r(iN_s - M_2) \end{pmatrix} = H(i)d + n(i),$$

where sample index $iN_S$ is defined as the index of the sample with which the pulse conveying d(i) begins, where constants $M_1$ and $M_2$ are real and positive and define the length L of an adaptive chip estimator of the receiver such that $M_1 + M_2 = L$; and suppressing multiple access interference by restoring orthogonality of the users' waveforms at the receiver by estimating transmitted multi-user chips d(i) using a blind adaptive algorithm that considers an output $\bar{h}_1 = (h_0, \ldots, h_L)^T$ of the channel impulse response estimator, without considering any received training sequence, where a sampled received signal is given by r(i).

8. A method as in claim 7, where an estimate of d(i) in the case of a single receiving antenna comprises:

$$\hat{d}(i) = w^H(i)r(i).$$

and where the blind adaptive estimation algorithm updates complex coefficients of the fractionally spaced multiuser chip estimator according to $$w(i+1) = w(i) + \mu(i)(E\{r(i)d\cdot(i)\} - r(i)d\cdot(i)) = w(i) + \mu(i)(\sigma_d^2 \bar{h}(i) - r(i)\hat{d}\cdot(i))$$

where E(·) denotes expectation and (·)* complex conjugate, $\mu(i)$ is a step size parameter, and $\bar{h}(i)$ is the column of H(i) that corresponds to d(i).

9. A method as in claim 7, further comprising despreading an output signal of the adaptive chip estimator with a symbol-synchronized code correlator which despreads and descrambles the output signal and outputs symbol decisions.

10. A method as in claim 7, where an estimate of d(i) in the case of N receiving antennas, where N>1, comprises:

$$\hat{d}(i) = (w_1^H(i) \ldots w_N^H(i)) \begin{pmatrix} r_1(i) \\ \vdots \\ r_N(i) \end{pmatrix}$$

where $$\begin{pmatrix} w_1(i+1) \\ \vdots \\ w_N(i+1) \end{pmatrix} = \begin{pmatrix} w_1(i) \\ \vdots \\ w_N(i) \end{pmatrix} + \mu(i) \begin{pmatrix} \sigma_d^2 \bar{h}_1(i) - r_1(i)\hat{d}^*(i) \\ \vdots \\ \sigma_d^2 \bar{h}_N(i) - r_N(i)\hat{d}^*(i) \end{pmatrix}.$$

* * * * *

UNITED STATES PATENT AND TRADEMARK OFFICE
CERTIFICATE OF CORRECTION

PATENT NO. : 6,658,047 B1
DATED : December 2, 2003
INVENTOR(S) : Petri Komulainen and Markku Heikkila It is certified that error appears in the above-identified patent and that said Letters Patent is hereby corrected as shown below:

Column 9,
Line 38, remove "-" and insert -- + --.

Signed and Sealed this

Thirtieth Day of March, 2004

JON W. DUDAS
*Acting Director of the United States Patent and Trademark Office*